March 29, 1955 R. D. FOX ET AL 2,705,037
PEACH PITTER
Filed July 22, 1952 4 Sheets-Sheet 1

INVENTORS
RICHARD D. FOX
ETHERIDGE R. McCLELLAND
BY Harper Allen
ATTORNEY

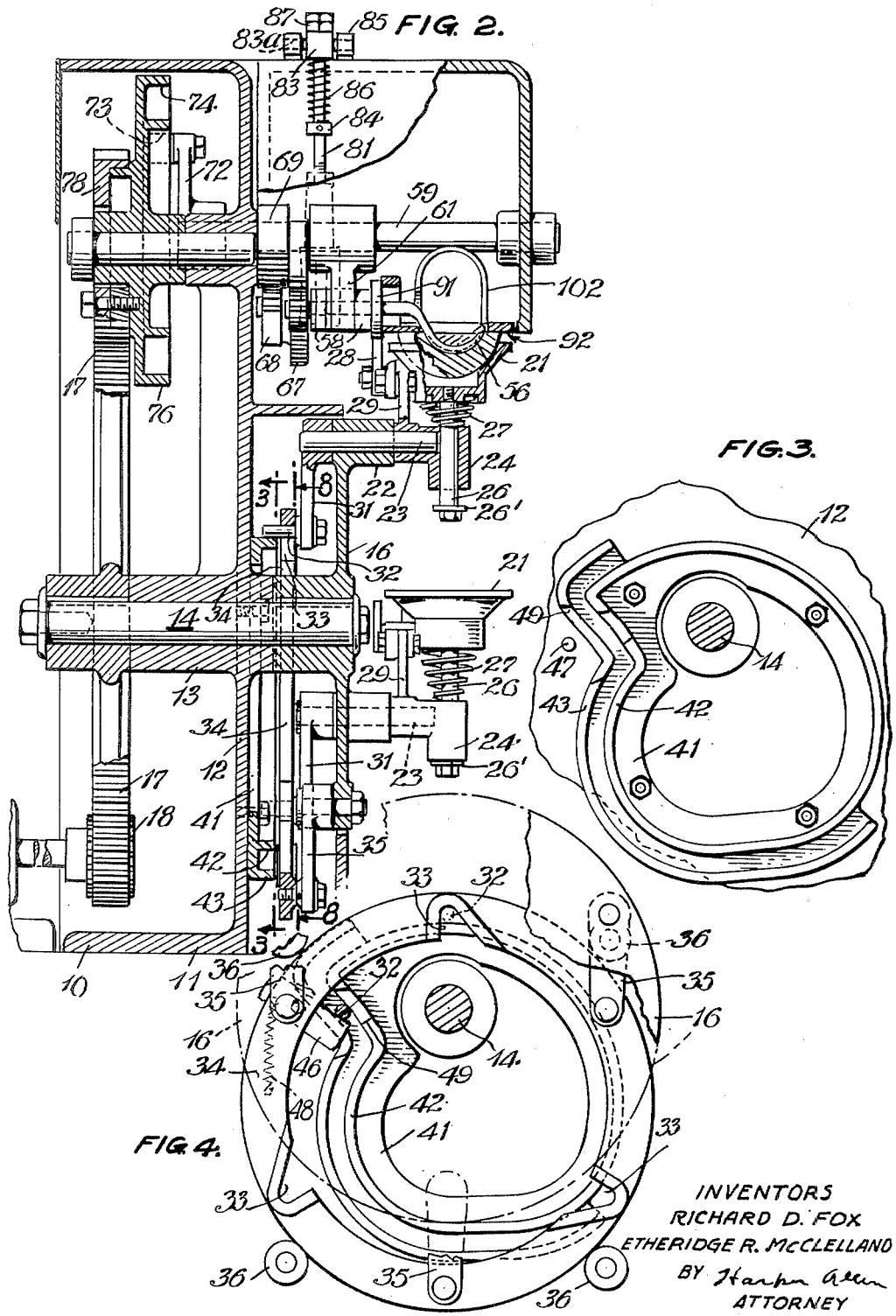

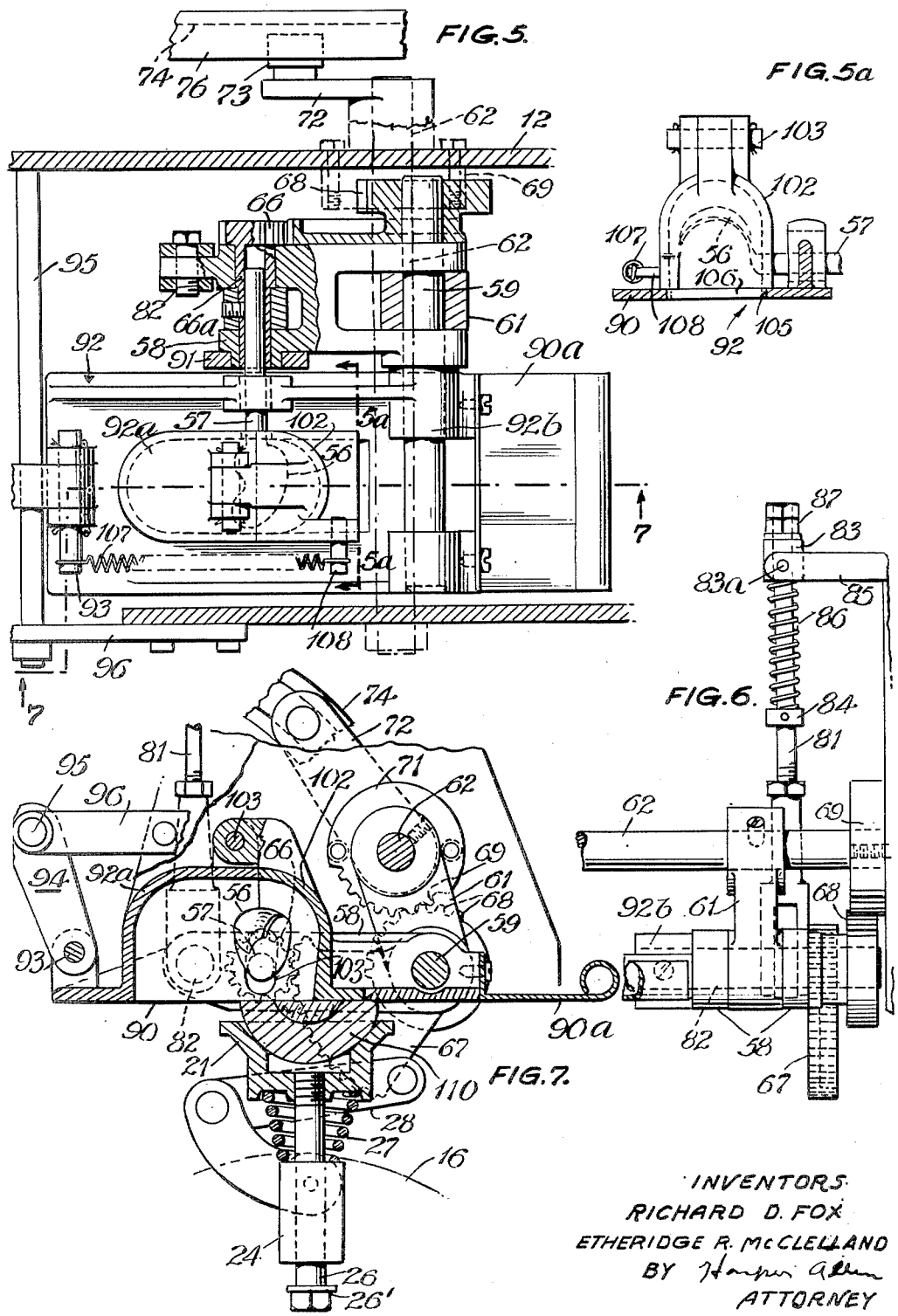

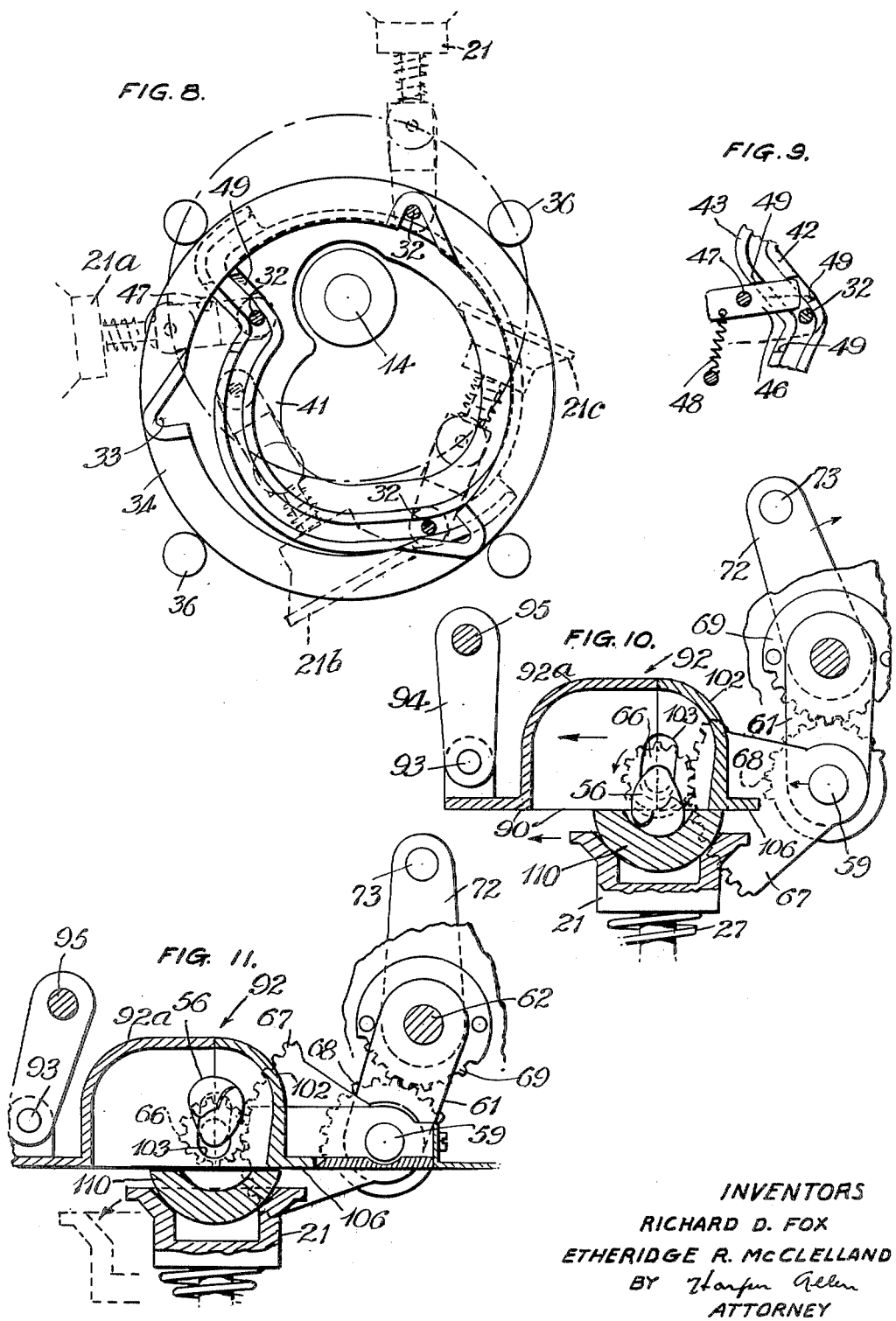

United States Patent Office 2,705,037
Patented Mar. 29, 1955

2,705,037

PEACH PITTER

Richard D. Fox, Santa Clara County, and Etheridge R. McClelland, San Pablo, Calif., assignors to Fruit Machinery Company, a corporation of Nevada Application July 22, 1952, Serial No. 300,254

11 Claims. (Cl. 146—28)

The present invention relates to peach pitting apparatus of the type in which peach halves are manually fed as a part of a pitting or re-pitting operation, and relates more particularly to apparatus of this type in which a vertically disposed turret is provided for rotation about a horizontal axis in upright position to be successively presented to a pit-removing spoon as they travel along a flattened or chordal portion of their normal circular path during removal of the pit halves from the peach halves.

The present invention is designed to provide an improved peach half ejecting control by movement of the cup during its rotation after the pitting operation, and to provide an improved construction and control of the pitting assembly which removes the pit half during travel of the cup along the upper portion of its path.

More particularly the improvement in pitting operation relates to a more delicate control of the depth of cut of the pitting spoon as well as the prevention of injury to the mechanism if for some reason the pit and knife or spoon become jammed during the pitting operation.

The above and other objects of the invention are obtained as illustrated in a preferred embodiment of the invention, shown in the accompanying drawings in which:

Figure 2 is an enlarged vertical sectional view taken as indicated by the line 2—2 in Figure 1.

Figure 3 is an elevational view of the control cam of the apparatus taken as indicated by the line 3—3 in Figure 2.

Figure 4 is an elevational view with certain parts broken away and shown in section.

Figure 5 is a plan view of the apparatus with certain parts broken away and shown in section to illustrate details of construction.

Figure 5a is a detail section taken as indicated by the line 5a—5a in Figure 5.

Figure 6 is a fragmentary elevational view of a portion of the pitting control mechanism.

Figure 7 is a sectional view taken on the line 7—7 in Figure 5 showing one cup in its relation to the pitting mechanism at the beginning of the pitting operation.

Figure 8 is a fragmentary sectional view taken as indicated by the line 8—8 in Figure 2.

Figure 9 is a fragmentary view similar to Figure 8 illustrating a detail of construction.

Figure 10 is a view similar to Figure 7 illustrating the relation of parts at a different portion of the pitting operation.

Figure 11 is a view similar to Figure 10 showing parts as positioned near the end of the pitting operation.

Figure 1:
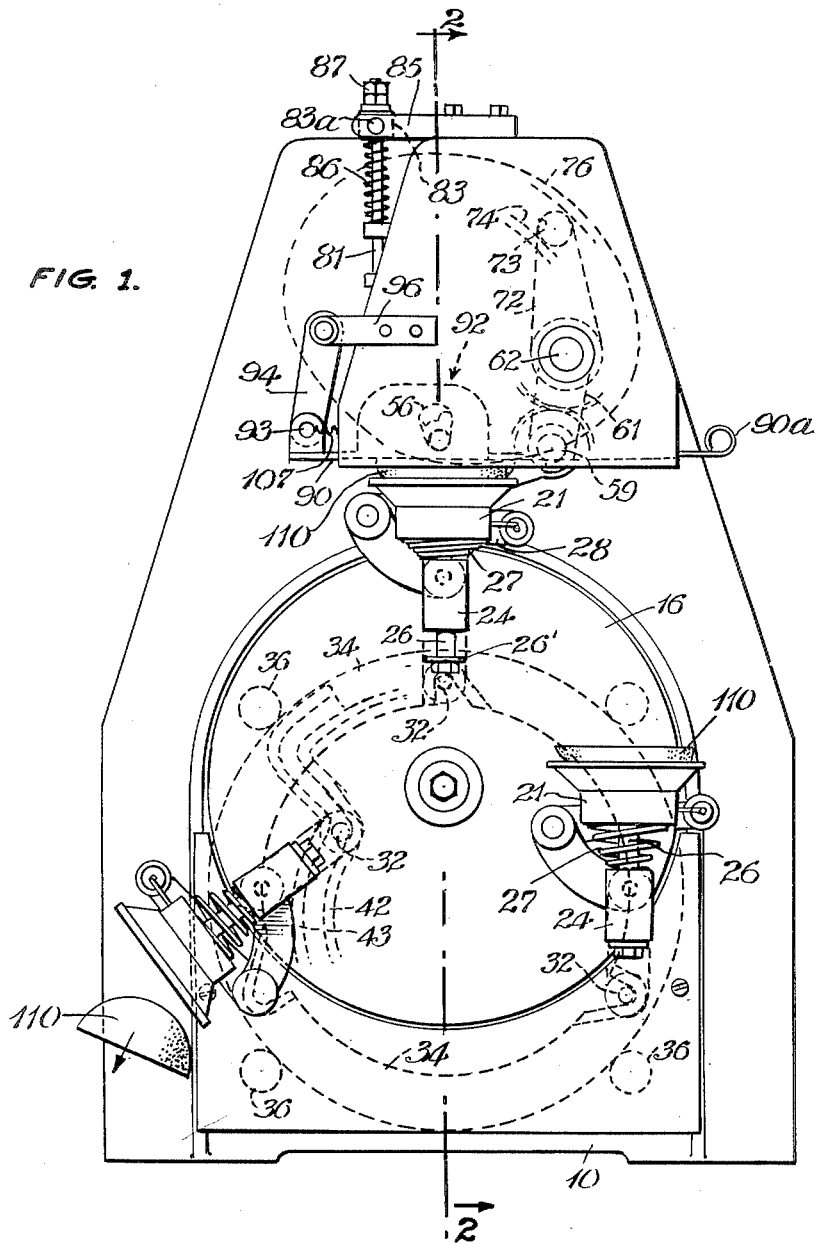
Figure 1 is a front elevational view of the machine.

Referring to Figures 1 and 2, the peach pitting machine includes a frame 10 of cast construction having a base portion 11 and a center upright wall 12 provided with a horizontal boss 13. A drive shaft 14 is journalled in the boss 13 and carries at one end the hub of a vertically disposed turret 16, referred to in greater detail hereinafter, and at the other end a drive gear 17 engaged with a pinion 18 of a suitable electric motor drive.

The feed turret 16 (Figures 1 and 2) of the apparatus carries a plurality of evenly spaced peach holding cups 21 and for this purpose is provided with a plurality of bosses 22 in each of which there is pivotally journalled a cup support shaft 23 having pinned on its outer end a cup mounting bracket 24. Each cup 21 carries a support rod 26 which is slidably mounted in the bracket 24 and is provided with a stop 26' at its lower end. A spring 27 is disposed between the cup 21 and the top of the bracket 24 and normally maintains the cup elevated. Associated with the cup support bracket 24 and the cup 21 is a depth control arm 28 pivoted on an arm 29 of the cup bracket 24 and connected to control the position of the spoon 56.

In order to control the cups 21 to maintain the upright position thereof during the portion of their travel in which a peach is fed thereto and during the pitting operation, and to eject the peach half, a linkage control means is connected to the cups 21 and the turret 16. Each of the support shafts 23 for the cups 21 has pinned at the left end thereof as seen in Figure 2, a control arm 31 which carries at its lower end a pin 32 which normally engages a V-shaped recess 33 in a control ring 34 (Figures 2 and 4). The ring 34 is mounted eccentrically with respect to the turret 16 by a distance corresponding to the length of the arms 31 and links 35 of equal length pivotally connected between the ring and the turret. The ring 34 is mounted for rotation by four equally spaced apart rollers 36 and is driven by the turret 16 through links 35. As long as the pins 32 are seated in the notches 33, the linkage connection between the turret 16 and the ring 34 maintains the arms 31 and the cups 21 in an upright position during the counter-clockwise rotation of the assembly.

Means are provided for controlling the engagement and disengagement of the cups with respect to the control ring 34 during their travel, and this means takes the form of a stationary cam plate 41 (Figures 4 and 8) having a cam track provided with an inner track wall 42 which is continuous throughout the 360 degrees of travel of a cup and an outer track wall 43 which extends around approximately 180 degrees of the travel.

Referring to Figures 4 and 8, it will be noted that the circular portion of the inner wall 42 of the cam track serves to hold the pins 32 engaged in the associated notches 33. This engagement maintains each cup upright during the feed of peach halves to the cup and during the travel of the cup past the pitting mechanism. As a cup leaves the pitting mechanism it will enter the portion of the cam where it is confined between the inner and outer walls of the cam tracks. The initial inwardly extending portion of the cam track serves to tilt or rotate the cup slightly over 90 degrees to the position 21a (Figure 8) where the pin 32 of the cup is approaching a V-shaped portion of the cam portions 42—43. This places the cup 21 ahead of its pin 32.

A one-way pawl 46 (Figures 4 and 9) is pivoted at 47 adjacent the V portion and is positioned in a milled slot 49 in the cam track, being urged by a spring 48 against a wall of the slot 49. The pawl 46 moves in behind each pin 32 and serves as a stop to prevent a pin from going back into the upper portion of the V and hooking on to the cam wall 43 due to gravity pivoting of the cup 21 if the machine stops with a cup 21 positioned with its pin 32 at the base of the V as shown in Figure 9. The subsequent portion of the cam track 42—43 gradually merges with the circular track portion causing the cup 21 to complete a full rotation as shown by the positions 21b and 21c thereof in Figure 8. The last portion of the full cam track again seats the pin 32 in the appropriate notch 33 of the control ring 34 so that the cup is again in upright position ready to receive the peach half.

As a cup 21 approaches the top of its path of movement, i. e., the pitting zone, with a peach half positioned herein, with its stem-blossom axis parallel to the turret 16, the peach half in the cup engages a guide plate 90a and begins its travel across the flattened or chordal portion of the path of travel of the cup, being slid from the guide plate 90a on to a bottom surface 90 of a peach positioning and control member 92 referred to hereinafter. During this travel the spoon 56 is operated to perform the pitting operation.

The spoon 56 (Figures 2, 5, 6 and 7) is of conventional construction and is carried by a shaft 57 releasably secured in the sleeve extension 66a of a pinion 66 rotatably journalled in the free end of an H-shaped link 58. The link 58 is pivotally connected at its other end by a shaft 59 to a depending rock arm 61 secured on a rock shaft 62.

The spoon 56 is provided with two motions during the travel of the peach half through the pitting zone, one of these being a linear travel coinciding with the linear path of travel of the cup 21 and the other being a rotative movement, both of these movements being controlled by the link 58, the rock arm 61, and their associated parts. The pinion 66 (Figures 7, 10 and 11) meshes with a gear segment 67 carried on the shaft 59. Formed integrally with the large gear segment 67 is a second gear segment 68 meshing with a stationary gear segment 69 formed integrally with the bearing 71 disposed about the rock shaft 62 and bolted to the case. The shaft 62 (Figures 2, 3 and 7) is journalled in the bearing 71 secured in the upright wall 12 of the housing 10 and carries a cam follower arm 72 having a roller 73 engaging with a cam track 74 of a cam member 76. The cam member 76 is secured to a gear 78 which meshes with the main drive gear 17. The cam 76 is rotated so as to move gear segment 68 clockwise from the position shown in Figure 7 to the successive positions thereof illustrated in Figures 10 and 11, so that the cam arm 72 and the arm 61 will be rotated clockwise from the position shown to move the link 58 and the spoon 56 to the left as viewed in Figure 7. This same movement also causes clockwise movement of the gear segment 67 so that the spoon is rotated during its linear movement to the left to cut the pit half from the peach half. After travel of the cup across the pitting zone the pitting spoon and associated parts are returned by the cam mechanism to their starting position.

It will be noted that the rotation of the gear segment 67 (Figures 2, 3 and 7) during a pitting stroke is in an upward direction and thus tends to lift the H arm 58 and the pitting spoon therewith away from the peach and resilient means are provided to resist this movement and to set the initial position of the pitting spoon for a pitting operation. This means takes the form of a link 81 (Figures 2, 5, 6 and 7) pivotally secured at 82 to the end of the H link 58 and extending upwardly through an apertured block 83 having aligned pins 83a in respective support castings 85 on the frame. The link 81 carries an adjustable stop 84 between which and the block 83 a spring 86 is interposed. A pair of nuts 87 are secured at the upper end of the link 86 to adjust the position of the lower end of the H link 58 and the initial position or elevation of the pitting spoon. This construction also provides for yielding of the pitting assembly in case the spoon strikes a pit or is otherwise jammed.

Means is provided to control the depth of cut of the spoon in accordance with the size of the peach half. As previously described, each cup assembly carries depth control arm 28 (Figure 2) and this arm is in vertical alignment with an eccentric ring 91 adjustably mounted on the H link 59. When a cup moves into the pitting zone, the active arm 28 engages the eccentric 91 and lifts the shaft 57 and the spoon 56 until the peach half engages the bottom surface 90 of a movable peach positioning member 92, the amount of lift depending upon the size of the peach half. With an empty cup the maximum lift is obtained.

The peach positioning member 92 (Figures 5, 5a and 7) comprises a casting pivoted at one end by bosses 92b on the shaft 59 and having a pivotal connection at 93 to a depending arm 94 pivotally mounted on a shaft 95 secured in a fixed arm 96 of the frame and wall 12 thereof. The arm 94 is parallel to the rock arm 61 so that the member 92 travels with the spoon and the peach half during the pitting operation. The knife shaft 57 extends through an elongated aperture 101 in a dome-shaped part of shield 92a of the member 92 formed above and about a pitting opening 105 in which the spoon or knife works to prevent pits from being thrown upwardly and becoming lodged in the operating mechanism. The member 92 provides a guide surface 90 comprising two parallel abutments for engagement of the flesh of the peach half at either side of the opening 105. The rearward part of the dome 92a, i. e. adjacent the place of exit of the spoon from a peach half is made yieldable in the event of a jam between the knife and a pit portion. This rear portion or element 102 is pivoted to the member 92 at 103 and has a shape conforming to the dome portion 92a of the member 92, and also includes a bottom plate portion 106 which fits down into the opening 105 and forms a yieldable shear plate a part of the peach engaging surface. A spring 107 is tensioned between the pin 108 on the element 102 and the pivot pin 93 to maintain the element in its normal position.

In operation with the turret rotating counter-clockwise as viewed in Figure 1, the operator feeds successive peach halves 110 into the cups 21 during the upward part of their travel. As a peach half arrives at the upper portion of the travel of the turret 16 it engages the guide plate 90a and slides on to the bottom surface 90 of the peach positioning member 92 (Figure 7) into the actual pitting zone, the stem-blossom axis of the peach pit having been placed transversely to the axis of the pitting shaft by the operator. At this time the depth control arm 28 has engaged the eccentric 91 on the H-link 58 and lifted the link and the spoon 56 against the resistance of spring 86 to control the depth of cut in accordance with the size of the peach half. As the center of the cup 21 moves into alignment with the pitting spoon 56, a cam 76 operates the rock shaft 62 so that the pitting spoon 56 and the peach positioning member 92 begin to travel with the peach half and the spoon begins to rotate to perform the pitting operation. Another position of the member during pitting is shown in Figure 10 and the position of the parts adjacent the end of the pitting stroke is shown in Figure 11. After the pitting operation is completed, the pin 32 associated with the particular cup assembly enters the cam track 42—43, is disengaged from the ring 34, and the cup 21 is moved to the successive positions 21a, 21b and 21c during the continued rotation of the turret, thereby effectively dumping or ejecting the peach half from the cup. During further travel, each cup is rotated back to its upright position.

While we have shown and described a preferred embodiment of the invention, it will be understood that the invention is capable of variation and modification from the particular form shown, so that its scope should be limited only by the scope of the claims appended hereto.

We claim:

1. In a peach pitter, a frame, a vertically disposed turret mounted on said frame for rotation about a horizontal axis, a fruit carrying cup carried by said turret for rotation through a circular path, and facing in a direction at right angles to said axis, pitting means for engagement with the fruit half in said cup in a pitting zone during a portion of the travel of the cup along its path, control means for maintaining said cup in facing position with respect to said pitting means, and other cup position control means active after the cup has traveled through the pitting zone for tilting said cup to discharge a peach half.

2. In a peach pitter, a frame, a vertically disposed turret mounted on said frame for rotation about a horizontal axis, a fruit carrying cup carried by said turret for rotation through a circular path and facing in a direction at right angles to said axis, pitting means for engagement with the fruit half in said cup during a portion of the travel of the cup along its path, control means for maintaining said cup in facing position with respect to said pitting means during said portion of said travel, and other cup position control means for moving said cup to discharge a peach half after pitting thereof.

3. In a peach pitter as recited in claim 2, in which said first-named control means comprises a member mounted for rotation about an axis parallel to and offset from said turret axis and a linkage connection between said member and said cup, and said other control means comprises a cam track for disengaging the linkage connection and for assuming control of said cup to effect movement thereof to discharge the peach half.

4. In a peach pitter as recited in claim 2, in which said first-named control means comprises a member mounted for rotation about an axis parallel to and offset from said turret axis and a linkage connection between said member and said cup, and said other control means comprises means for disabling the linkage connection and for assuming control of said cup to effect movement thereof to discharge the peach half.

5. In a peach pitter as recited in claim 2, in which said first-named control means comprises a rotary member mounted for movement about an axis parallel to and offset from said turret axis and a linkage connection between said member and said cup having a disengageable seating in said member, and said other control means comprises a cam track having a circular portion for maintaining said linkage connection in engagement with said member and having another portion for moving said linkage connection out of engagement with said member and for rotating said cup to effect discharge of a peach half.

6. In a peach pitter, a frame, a turret mounted for rotation on said frame in upright position about a horizontal axis, a peach cup yieldably carried by said turret, and pitting mechanism adjacent the upper portion of the path of travel of said cup on said turret including a peach half positioning member positioned for engagement by a peach half in said cup and to cause yielding of said cup to effect linear travel of said cup along said portion of its path during the pitting operation, means mounting said member for movement with said peach cup, said mounting means including a rock arm carried on said frame about a horizontal axis, a support arm pivotally mounted on said rock arm at one end, a pitting knife carried in said support arm adjacent the other end, a drive connection including a gear on said knife and a meshing segmental gear on said rock arm having an upward direction of travel during movement of said member with said cup, and means for yieldably resisting upward movement of said support arm due to the thrust of said gear segment.

7. In a peach pitter as recited in claim 6 in which said peach positioning member includes a dome-shaped portion above said knife for shielding said pitting knife.

8. In a peach pitter as recited in claim 6 in which said peach positioning member includes means above said knife for shielding said pitting knife.

9. In a peach pitter as recited in claim 6 in which said peach positioning member includes a dome-shaped portion above said knife for shielding said pitting knife, said dome-shaped portion including a yieldable element defining the shear point of said knife with respect to a peach half.

10. In a peach pitter as recited in claim 6 in which said peach positioning member includes means above said knife for shielding said pitting knife, said means including a yieldable element defining the shear point of said knife with respect to a peach half.

11. In a peach pitter as recited in claim 6 in which said peach positioning member includes an element positioned adjacent said pitting knife and presenting a surface for engagement by the peach half, said element being mounted for upward yielding movement.

References Cited in the file of this patent

UNITED STATES PATENTS

| | | |
|---|---|---|
| 2,313,318 | Brown | Mar. 9, 1943 |
| 2,376,526 | Thompson | May 22, 1945 |
| 2,428,157 | Healy | Sept. 30, 1947 |
| 2,443,863 | Lindley, Jr. | June 22, 1948 |
| 2,533,350 | Cahill | Dec. 12, 1950 |
| 2,622,002 | Kingsbury | Dec. 16, 1952 |
| 2,629,416 | Luther | Feb. 24, 1953 |

FOREIGN PATENTS

| | | |
|---|---|---|
| 6,169 | Australia | Feb. 17, 1932 |
| 603,356 | Germany | Sept. 28, 1934 |